US009487653B2

(12) United States Patent
Jacob et al.

(10) Patent No.: US 9,487,653 B2
(45) Date of Patent: Nov. 8, 2016

(54) PROCESS OF MAKING CROSSLINKED POLYOLEFIN POLYMER BLENDS AND COMPOSITIONS PREPARED THEREOF

(71) Applicants: ExxonMobil Chemical Patents Inc., Baytown, TX (US); Keli Jackson, Baytown, TX (US)

(72) Inventors: Sunny Jacob, Seabrook, TX (US); Michael J. Goncy, Kent, OH (US); Gregory K. Hall, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/961,997

(22) Filed: Dec. 8, 2015

(65) Prior Publication Data

US 2016/0090452 A1    Mar. 31, 2016

(51) Int. Cl.
*C08F 2/46* (2006.01)
*C08J 3/28* (2006.01)
*C08G 61/04* (2006.01)
*C08L 51/04* (2006.01)
*C08J 3/24* (2006.01)

(52) U.S. Cl.
CPC ............... *C08L 51/04* (2013.01); *C08J 3/246* (2013.01); *C08J 2323/16* (2013.01); *C08J 2351/06* (2013.01); *C08J 2423/16* (2013.01); *C08L 2205/025* (2013.01)

(58) Field of Classification Search
CPC .......... C08J 3/24; C08J 3/28; C08J 2351/04; C08L 51/04; C08L 2205/025
USPC ........................... 522/110, 109, 1, 111; 520/1
See application file for complete search history.

(56) References Cited

U.S. PATENT DOCUMENTS

| | | | |
|---|---|---|---|
| 4,540,753 A | 9/1985 | Cozewith et al. | |
| 6,525,157 B2 | 2/2003 | Cozewith et al. | |
| 6,559,262 B1 | 5/2003 | Waymouth et al. | |
| 6,881,800 B2 | 4/2005 | Friedersdorf | |
| 7,232,871 B2 | 6/2007 | Datta et al. | |
| 7,863,364 B2 | 1/2011 | Westwood et al. | |
| 7,867,433 B2 | 1/2011 | Jacob et al. | |
| 7,994,237 B2 | 8/2011 | Kiss et al. | |
| 8,013,069 B2 | 9/2011 | Harrington et al. | |
| 8,178,031 B2 | 5/2012 | Jacob et al. | |
| 8,431,065 B2 | 4/2013 | Jacob | |
| 8,742,019 B2 | 6/2014 | Jacob et al. | |
| 8,765,834 B2 | 7/2014 | Jacob | |
| 8,975,334 B2 | 3/2015 | Jacob | |
| 2012/0202915 A1* | 8/2012 | Jacob | C08L 23/145 522/158 |

FOREIGN PATENT DOCUMENTS

| | | |
|---|---|---|
| EP | 1 614 699 | 1/2006 |
| WO | 99/45041 | 9/1999 |
| WO | 99/52950 | 10/1999 |
| WO | 99/52955 | 10/1999 |
| WO | 03/040201 | 5/2003 |
| WO | 2005/049672 | 6/2005 |

OTHER PUBLICATIONS

Yang et al, Mechanism of a One-Step Method for Preparing Silane Grafting and Cross-linking Polypropylene, 2007, Polymer Engineering and Science, 47, 1004-1008.*
Subramaniam, "Natural Rubber", Rubber Technology, pp. 179-208 (1995).
Rudnick et al., "Synthetic Lubricants and High-Performance Functional Fluids", Second Edition, Marcel Dekker, Inc., pp. 357-392, (1999).
Ver Strake et al., "Near Monodisperse Ethylene-Propylene Copolymers by Direct Ziegler-Natta Polymerization, Preparation, Characterization, Properties", Macromolecules, 1988, vol. 21, pp. 3360-3371.
Yang et al., "Mechanism of a One-Step Method for Preparing Silane Grafting and Cross-linking Polypropylene", vol. 47, Issue 7, Polymer Engineering and Science, pp. 1004-1008 (2007).

* cited by examiner

*Primary Examiner* — Ling Choi
*Assistant Examiner* — Jessica E Whiteley
(74) *Attorney, Agent, or Firm* — Priya G. Prasad; Stephen A. Baehl

(57) ABSTRACT

Provided herein is a process for making a grafted crosslinked polymer blend, by polymerizing a first and second polymer solution (each having 75 to 99 wt % propylene-derived units, 1 to 25 wt % ethylene-derived units, and 0.05 to 6 wt % diene-derived units); combining the first and second polymer solution to produce a polymer blend solution; removing solvent from the polymer blend solution to produce a polymer blend; mixing the polymer blend with a coagent and a vinyl-terminated silane compound; subjecting the polymer blend to electron beam irradiation to grafting the vinyl-terminated silane compound to either or both of the first polymer and the second polymer to form a grafted polymer blend; and moisture curing the grafted polymer blend to form a grafted cross-linked polymer blend, wherein the grafted cross-linked polymer blend is substantially free of peroxide.

16 Claims, No Drawings

PROCESS OF MAKING CROSSLINKED POLYOLEFIN POLYMER BLENDS AND COMPOSITIONS PREPARED THEREOF

FIELD OF THE INVENTION

This invention is related to a process of making crosslinked polyolefin polymer blends and compositions prepared thereof.

BACKGROUND OF THE INVENTION

Polyolefin polymers and polymer blends are known for their versatility and applicability in a wide variety of uses. In particular, many polyolefin polymers, including copolymers of propylene with other α-olefins such as ethylene, are well suited for use in applications requiring good stretchability, elasticity, and strength. Materials with good stretchability and elasticity are used to manufacture a variety of disposable articles in addition to durable articles including but not limited to incontinence pads, disposable diapers, training pants, clothing, undergarments, sports apparel, automotive trim, weather-stripping, gaskets, and furniture upholstery. For clothing, stretchability and elasticity are performance attributes that allow the materials to provide a closely conforming fit to the body of the wearer.

While numerous materials are known to exhibit excellent stress-strain properties and elasticity at room temperatures, it is often desirable for elastic materials to provide a conforming or secure fit during repeated use, during extensions and retractions at elevated or depressed temperatures, or in automobile interiors during summer months. Elasticity at elevated temperatures is also important for maintaining tight tolerances throughout temperature cycles. In particular, elastic materials used for repeated wear clothing or garments must maintain their integrity and elastic performance after laundering.

Spandex, a segmented polyurethane urea elastic material, is currently used in various durable fabrics. For example, fibers made from Spandex have been used in launderable apparels, fabrics, durable and disposable furnishing, beddings, etc. Similar to conventional uncrosslinked polyolefin-based elastic materials, articles made from Spandex can lose integrity, shape, and elastic properties when subjected to elevated temperatures. Thus, Spandex is not suitable for many co-knitting applications with high temperature fibers, such as polyester fibers.

Many polyolefin blends such as those disclosed in the prior art are formed into pellets for intermediate storage purposes before being shaped into articles such as fibers, films, nonwovens, extruded coatings, and molded articles. Some of these compositions, however, are known to exhibit poor pellet stability over extended periods of time, leading to agglomeration of pellets and resulting in poor pourability and flowability of the pellets. U.S. Pat. No. 8,975,334 discloses the process of making a crosslinked article from a propylene-based composition to address some of these limitations, using peroxide. Conventional grafting processes generally disclose using chemical agents, such as peroxide. However, the inclusion of peroxide may lead to formation of gels, making it difficult to fabricate continuous aesthetic parts in some applications.

Accordingly, there is still a need for new and improved propylene-based materials which exhibit good pellet stability while also displaying good stretchability and elasticity for use in a wide variety of applications with reduced tendency to form a gel during the grafting process.

SUMMARY OF THE INVENTION

A process for making a grafted cross-linked polymer blend comprising the steps of polymerizing a first polymer solution comprising a first polymer in a first reactor; polymerizing a second polymer solution comprising a second polymer in a second reactor; wherein the first and second polymers each comprise from about 75 to about 99 wt % propylene-derived units, from about 1 to about 25 wt % ethylene-derived units, and from about 0.05 to about 6 wt % diene-derived units; combining the first polymer solution with the second polymer solution to produce a polymer blend solution comprising a solvent, the first polymer, and the second polymer; removing the solvent from the polymer blend solution to produce a polymer blend; mixing the polymer blend with a coagent and a vinyl-terminated silane compound; subjecting the polymer blend to electron beam irradiation, thereby grafting the vinyl-terminated silane compound to either or both of the first polymer and the second polymer in the polymer blend to form a grafted polymer blend; and moisture curing the grafted polymer blend to form a grafted cross-linked polymer blend, wherein the grafted cross-linked polymer blend is substantially free of peroxide.

DETAILED DESCRIPTION OF THE INVENTION

The present invention is directed to polyolefin polymer blends and processes for their production. More particularly, embodiments of the invention include blends of a first propylene-based polymer formed in a first reactor with a second propylene-based polymer produced in a second reactor. These polymer blends may be compounded with a variety of additional components including coagents, antioxidants, secondary elastomers, polypropylene, additives, fillers, and additive oils, among others. The blends may further be at least partially grafted by exposure to energetic photons from sources including ultraviolet (UV) light, x-rays, and gamma rays. In some embodiments, grafting of the polymer blends is accomplished via electron beam (e-beam) radiation. The polymer blends described herein exhibit improved pellet stability when compared to similar blends prepared in a single reactor, and have exceptional mechanical and elastic properties. In particular, when the polymer blends described herein are compounded with a coagent, an antioxidant, and subsequently grafted via e-beam radiation and crosslinked via moisture curing, they have improved properties such as peak stress, peak elongation, tension set when compared to polymer blends prepared in the same manner and having similar compositions but grafted with the use of peroxide. The polymer blends and methods for their production are described in greater detail below.

Polymers Comprising the Blend

The present invention comprises a first polymer prepared in a first reactor and a second polymer prepared in a second reactor. The first and second polymers are typically olefin-based polymers, and in some embodiments each is a propylene-based homopolymer or copolymer. As used herein, the term "copolymer" is intended to mean a material which is prepared by copolymerizing at least two different co-monomer types, including co-monomers derived from α-olefins and dienes. One or more other different co-monomer types may also be included in the copolymer such that the copolymer definition includes terpolymers as well as copolymers comprising four or more different comonomer types. The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction. Different monomers are discussed herein, including propylene monomers, ethylene monomers, and diene monomers.

In some embodiments of the present invention, the first and second polymers are each a copolymer of propylene and one or more comonomers. The comonomers may be linear or branched. In one or more embodiments, linear comonomers may include ethylene or $C_4$ to $C_8$ α-olefins, including but not limited to 1-butene, 1-hexene, and 1-octene. Branched comonomers may include 4-methyl-1-pentene, 3-methyl-1-pentene, and 3,5,5-trimethyl-1-hexene. In one or more embodiments, the comonomer can include styrene.

In some embodiments, the first and second polymers are each a copolymer of propylene and ethylene (and may comprise other comonomers as well). For example, the first and second polymers may be the same or different, and may each comprise from about 75 to about 99 wt % units derived from propylene and from about 1 to about 25 wt % units derived from ethylene. In some embodiments, the first polymer may comprise from about 12 to about 20 wt % ethylene-derived units, or from about 14 to about 18 wt % ethylene-derived units. In the same or other embodiments, the second polymer may comprise from about 3 to about 10 wt % ethylene-derived units, or from about 5 to about 8 wt % ethylene-derived units. In one embodiment of the present invention, the first polymer has a greater ethylene content than the second polymer. For example, the first polymer may comprise at least 3 wt %, or at least 5 wt %, or at least 7 wt %, or at least 9 wt % more ethylene-derived units than the second polymer.

In one or more embodiments herein, the second polymer may alternately comprise lower amounts of ethylene, or no ethylene at all, such that the second polymer may be homopolypropylene or a random copolymer of polypropylene (RCP). Exemplary RCPs typically comprise from about 1 to about 8 wt % comonomer, or from about 2 to about 5 wt % comonomer. In one or more embodiments, the RCP comonomer is ethylene.

Optionally, the first and second polymers may also include one or more dienes. The term "diene" is defined as a hydrocarbon compound that has two unsaturation sites, i.e., a compound having two double bonds connecting carbon atoms. Depending on the context, the term "diene" in this patent refers broadly to either a diene monomer prior to polymerization, e.g., forming part of the polymerization medium, or a diene monomer after polymerization has begun (also referred to as a diene monomer unit or a diene-derived unit). Exemplary dienes suitable for use in the present invention include, but are not limited to, butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyltetrahydroindene; dicyclopentadiene; bicyclo(2.2.1)hepta-2,5-diene; and alkenyl-, alkylidene-, cycloalkenyl-, and cycloalkylidene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexane, allyl cyclohexane, vinylcyclooctene, 4-vinylcyclohexene, allyl cyclodecene, vinylcyclododecene, and tetracyclododecadiene. In some embodiments of the present invention, the diene is selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In one or more embodiments, the diene is ENB.

The first and second polymers may comprise the same or different amounts of diene-derived units. In some embodiments, the first and second polymers each comprise from 0.05 to about 6 wt % diene-derived units. In further embodiments, the first polymer comprises from about 0.5 to about 5.0 wt % diene-derived units, or from about 1.0 to about 3.0 wt % diene-derived units. In the same or different embodiments, the second polymer comprises from about 0.1 to about 1.0 wt % diene-derived units.

The first and second polymers may have a weight average molecular weight (Mw) of 5,000,000 g/mole or less, a number average molecular weight (Mn) of about 3,000,000 g/mole or less, a z-average molecular weight (Mz) of about 10,000,000 g/mole or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D.

In one or more embodiments, the first and second polymers have the same or different Mw, and each have an Mw of about 5,000 to about 5,000,000 g/mole, or an Mw of about 10,000 to about 1,000,000, or an Mw of about 20,000 to about 500,000, or an Mw of about 50,000 to about 400,000, where Mw is determined as described herein.

In one or more embodiments, the first and second polymers may have the same or different Mn, and each have an Mn of about 2,500 to about 2,500,000 g/mole, or an Mn of about 5,000 to about 500,000, or an Mn of about 10,000 to about 250,000, or an Mn of about 25,000 to about 200,000, where Mn is determined as described herein.

In one or more embodiments, the first and second polymers have the same or different Mz, and each have an Mz of about 10,000 to about 7,000,000 g/mole, or an Mz of about 50,000 to about 1,000,000, or an Mz of about 80,000 to about 700,000, or an Mz of about 100,000 to about 500,000, where Mz is determined as described herein.

The molecular weight distribution (MWD=(Mw/Mn)), sometimes referred to as a "polydispersity index" (PDI), of the first and second polymers may be the same or different, and may be from about 1.5 to 40. In some embodiments the MWD can have an upper limit of 40, or 20, or 10, or 5, or 4.5, and a lower limit of 1.5, or 1.8, or 2.0. In one or more embodiments, the MWD of the first polymer or the second polymer or both is about 1.8 to 5. Techniques for determining the molecular weight (Mn, Mw, and Mz) and molecular weight distribution (MWD) can be found in U.S. Pat. No. 4,540,753 (Cozewith, Ju and Verstrate) (which is incorporated by reference herein for purposes of U.S. practices) and references cited therein, in Macromolecules, 1988, volume 21, p 3360 (Verstrate et al.), which is herein incorporated by reference for purposes of U.S. practice, and references cited therein, and in accordance with the procedures disclosed in U.S. Pat. No. 6,525,157, column 5, lines 1-44, which patent is hereby incorporated by reference in its entirety.

In one or more embodiments, the first and second polymers may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight ($M_v$) as the polymer. $\eta_l = KM_v^\alpha$, K and $\alpha$ are measured values for linear polymers and should be obtained on the same instrument as the one used for the g' index measurement.

In one or more embodiments, the first and second polymers may have the same or different density, which may be from about 0.85 g/cm$^3$ to about 0.92 g/cm$^3$, or from about 0.87 g/cm$^3$ to 0.90 g/cm$^3$, or from about 0.88 g/cm$^3$ to about 0.89 g/cm$^3$ at room temperature as measured per the ASTM D-1505 test method.

In one or more embodiments, the first and second polymer can have a melt flow rate (MFR, 2.16 kg weight @ 230° C.) greater than or equal to 0.2 g/10 min as measured according to the ASTM D-1238(A) test method. The MFR of the first and second polymers can be the same or different. In some embodiments, the MFR (2.16 kg @ 230° C.) of the first polymer or the second polymer or both is from about 0.5 g/10 min to about 200 g/10 min, or from about 1 g/10 min to about 100 g/10 min. In some embodiments, the first and/or second polymers have an MFR of from about 0.5 g/10 min to about 200 g/10 min, or from about 2 g/10 min to about 30 g/10 min, or from about 5 g/10 min to about 30 g/10 min, or from about 10 g/10 min to about 30 g/10 min, or from about 10 g/10 min to about 25 g/10 min, or from about 2 g/10 min to about 10 g/10 min.

The first and/or second polymers may have a Mooney viscosity, ML (1+4)@125° C., as determined according to ASTM D1646, of less than 100, or less than 75, or less than 60, or less than 30. The Mooney viscosity of the first and second polymers may be the same or different.

In one or more embodiments, the first polymer or second polymer or both may have a heat of fusion (Hf) determined according to the DSC procedure described later, which is greater than or equal to about 0.5 Joules per gram (J/g), and is less than or equal to about 80 J/g, or less than or equal to about 75 J/g, or less than or equal to about 70 J/g, or less than or equal to about 60 J/g, or less than or equal to about 50 J/g. The first polymer or second polymer or both may also have a heat of fusion that is greater than or equal to about 1 J/g, or greater than or equal to about 5 J/g. In another embodiment, the first polymer or second polymer or both may have a heat of fusion (Hf) which is from about 0.5 J/g to about 75 J/g, or from about 1 J/g to about 75 J/g, or from about 3 J/g to about 35 J/g. In some embodiments, the polymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion of the first polymer or the second polymer or both ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g. The heat of fusion of the first and second polymers may be the same or different.

The crystallinity of the first and second polymers can also be expressed in terms of percentage of crystallinity (i.e., % crystallinity). In one or more embodiments, the first polymer and second polymers have the same or different crystallinity, and the % crystallinity of one or both of the polymers may be from 0.5% to 40%, or from 1% to 30%, or from 5% to 25%, where % crystallinity is determined according to the DSC procedure described below. For reference purposes, the thermal energy for the highest order of polypropylene is estimated at 189 J/g (i.e., 100% crystallinity is equal to 209 J/g).

In addition to this level of crystallinity, the first and second polymers may have a single broad melting transition. However, the polymers can show secondary melting peaks adjacent to the principal peak, but for purposes herein, such secondary melting peaks are considered together as a single melting point, with the highest of these peaks (relative to baseline as described herein) being considered the melting point of the polymer.

The first and second polymers may have the same or different melting point, and, in some embodiments, one or both of the first and second polymers has a melting point (measured by DSC) of equal to or less than 110° C., or less than 100° C., or less than 90° C., or less than or equal to 80, or less than or equal to 75° C., or from about 25° C. to about 80° C., or from about 25° C. to about 75° C., or from about 30° C. to about 65° C. In these or other embodiments, the melting point of the second polymer is greater than the melting point of the first polymer, and may be greater than about 105° C., or greater than about 110° C., or greater than about 115° C.

The Differential Scanning calorimetry (DSC) procedure can be used to determine heat of fusion and melting temperature of the first and second polymers, as well as that of a blend of the first and second polymers. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (23-25° C.) for about 8 days. At the end of this period, an about 15-20 mg disc is removed from the pressed pad using a punch die and is placed in a 10 microliter aluminum sample pan. The sample is placed in a Differential Scanning calorimeter (Perkin Elmer Pyris 1 Thermal Analysis System) and is cooled to about −100° C. The sample is heated at 10°

C./min to attain a final temperature of about 165° C. The thermal output, recorded as the area under the melting peak of the sample, is a measure of the heat of fusion and can be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The first and/or second polymers may further have a triad tacticity of three propylene units, as measured by $^{13}$C NMR, of 75% or greater, 80% or greater, 82% or greater, 85% or greater, or 90% or greater. In some embodiments, the triad tacticity of the first polymer, the second polymer, or both ranges from about 50 to about 99%, or from about 60 to about 99%, or from about 75 to about 99%, or from about 80 to about 99%, or from about 60 to about 97%. Triad tacticity is determined by the methods described in U.S. Pat. No. 7,232,871, which is incorporated herein by reference.

Preparation of the Polymer Blend

Particles made from polymers of the type described herein are generally soft to the touch and may be tacky. While these properties are desirable for many end-use applications, the polymers may present storage and handling problems. For example, polymer particles, commonly referred to in the industry as pellets, made from these polymers have a tendency to agglomerate (or exhibit restricted flow), particularly after long-term warehouse storage at ambient temperatures.

It has been discovered that agglomeration of these pellets results from deformation of the polymer pellets during storage and handling of the pellets during the first few hours or days following production of the pellets. Specifically, upon production, polymer pellets generally have shapes that are spherical, cylindrical, disk-like, or other shapes in which the outer surface of the pellets are curved as opposed to flat surfaces. Generally, polymer pellets are free-flowing, as the curved surfaces of the pellets have minimal contact surface and thus slide freely past each other. However, it has been discovered that under certain circumstances, the curved pellet surfaces may become flattened during storage as a result of the pellets pressing against each other, especially when stored in containers with significant vertical dimensions. When this flattening of the surfaces of the polymer pellets occurs, contact area increases significantly, reducing the ability of the pellet surfaces to slide past each other, leading to agglomeration or restricted flow of the particles in subsequent processing steps.

By increasing the rate of crystallization, flattening of the surfaces of the pellets is less likely to occur and the pellets can become hard in the course of conventional polymer finishing steps to provide free-flowing pellets, even after the pellets are stored for long periods of time at high ambient temperatures.

The resistance of a pellet to flattening of its surfaces is related to the level of crystallization of the polymers and may be determined by measuring the hardness of the polymer pellets. Generally, it has been determined, in one embodiment, that a Shore A Hardness (ASTM 2240) of at least 50 provides pellets with a reduced tendency to agglomerate. In another embodiment, a Shore A Hardness of at least 55 provides pellets with a reduced tendency to agglomerate. In a further embodiment, a shore A Hardness of at least 60 provides pellets with a reduced tendency to agglomerate. While pellets made from many low crystallinity polymers may achieve this level of hardness following production, it may take days before this level of hardness is attained as the pellets crystallize slowly over time, particularly for propylene-based polymers and copolymers where crystallization kinetics are known to be slower than ethylene-based polymers and copolymers. The processes described herein speed the rate of crystallization of the polymer pellets to provide a hardness, in a short period of time after production, which enables the pellets to flow freely, even after long storage periods.

In certain embodiments of the processes and blends described herein, a first polymer is blended with a second polymer to produce a polymer blend that, when processed into pellet forms, will achieve a state of crystallization sufficient to provide a Shore A hardness of at least 50, or at least 52, or at least 55, or at least 57, or at least 60, in a relatively short period time (i.e., within 40 minutes after initial cooling of the pellets, or within 30 minutes, or within 20 minutes, or within 15 minutes), as compared to pellets produced from the first polymer alone.

For purposes of this disclosure, the first polymer, as described above, may generally be considered a low crystallinity polymer, while the second polymer, as described above, may generally be considered a high crystallinity polymer. It has been discovered that the agglomeration tendencies of pellets made from low crystallinity polymers may be reduced or eliminated by blending the low crystallinity polymer with at least one high crystallinity polymer incorporating propylene-derived units having high crystallinity. For purposes of this disclosure, a high crystallinity polymer incorporating propylene-derived units means a polymer incorporating at least 90 wt % of propylene derived units and having a melt temperature of at least 100° C.

In certain embodiments of the processes and blends described herein, solutions of a first low crystallinity polymer and a second high crystallinity polymer are blended via a process which produces the polymers in separate series or parallel polymerization stages. For example, the first low crystallinity polymer may be produced in a first reactor. An effluent from the first reactor, containing a solution of the first polymer, is transferred to a second reactor where a catalyst and monomers necessary to produce the second high crystallinity polymer are contacted, so that a solution of the second polymer is produced in the second reactor and in the presence of the first polymer. This is referred to as a series reactor process.

Both the first polymer and the second polymer may be produced in solution polymerization reactors. Combining the solutions of the polymeric components resulting from these processes provides an intimate blending of the first and second polymers during polymerization of the second copolymer. The blended polymers are then withdrawn from the second reactor and processed into polymer particles, fibers, films, nonwovens, or other finished articles using conventional processing equipment and techniques.

Alternatively, the first low crystallinity polymer may be produced in the first reactor in parallel with the second high crystallinity polymer produced in the second reactor. In parallel polymerization processes, the first and second polymers are produced in parallel reactors with effluents from each reactor, containing solutions of the respective polymer, directed to a device for blending the effluents to produce a solution of blended polymer components. The blended polymers are then recovered from the solution and processed into polymer particles, fibers, films, nonwovens, or other finished articles in accordance with conventional process equipment and techniques.

Preferred methods and catalysts for producing the propylene-based polymers are found in U.S. Pat. Nos. 7,232, 871 and 6,881,800 and International Patent Publication No. WO05/049672, the contents of which are all incorporated by reference herein. Pyridine amine complexes, such as those described in International Patent Publication No. WO03/040201 are also useful to produce the propylene-based polymers useful herein. The catalyst can comprise a fluxional complex, which undergoes periodic intra-molecular re-arrangement so as to provide the desired interruption of stereoregularity as described in U.S. Pat. No. 6,559,262. The catalyst can be a stereorigid complex with mixed influence on propylene insertion, see EP Patent Application No. 1070087. The catalyst described in EP Patent Application No. 1614699 can also be used for the production of backbones suitable for the invention.

More detailed descriptions of both series and parallel processes suitable for production of the polymer blends described herein, including polymerization conditions and suitable catalysts for use therein, are found in U.S. Pat. Nos. 6,881,800 and 8,013,069, both of which are incorporated by reference herein in their entireties.

In alternate embodiments of the present invention, the first and second polymers may be produced in high pressure solution processes. Such processes, including polymerization conditions and suitable catalysts for use therein, are described in more detail in U.S. Pat. No. 7,994,237, which is incorporated by reference herein in its entirety.

In some embodiments of the present invention, polymer blends of the invention are produced by polymerizing a polymer solution comprising a first polymer in a first reactor, polymerizing a polymer solution comprising a second polymer in a second reactor, combining the first polymer solution with the second polymer solution to produce a polymer blend solution, and processing the polymer blend solution to produce a polymer blend.

Properties of the Polymer Blend

In certain embodiments of the present invention, the polymer blends produced by the dual reactor process described above may incorporate, in neat form, from about 45 wt % to about 98 wt %, or from about 50 wt % to about 98 wt %, or from about 60 wt % to about 98 wt %, or from about 70 wt % to about 98 wt % of the first polymer and from about 2 wt % to about 55 wt %, or from about 2 wt % to about 50 wt %, or from about 2 wt % to about 40 wt %, or from about 2 wt % to about 30 wt % of the second polymer. In another embodiment, in neat form, the polymer blends described herein incorporate from about 80 wt % to about 95 wt % of the first polymer and from about 5 wt % to about 20 wt % of the second polymer. In other embodiments, in neat form, the polymer blends described herein incorporate from about 90 wt % to about 95 wt % of the first polymer and from about 5 wt % to about 10 wt % of the second polymer.

In further embodiments of the invention, the polymer blends may comprise an overall ethylene content of from about 10 to about 18 wt %, or from about 12 to about 16 wt % ethylene. In the same or other embodiments, the blends may comprise from about 0.1 to about 5.0 wt % diene-derived units, or from about 0.5 to about 3.0 wt % diene-derived units, or from about 1.0 to about 2.0 wt % diene-derived units.

In some embodiments, the polymer blends described herein may have a melt flow rate (MFR, 2.16 kg weight @ 230° C.) of from about 1 to about 10 g/10 min, as measured according to the ASTM D-1238(A) test method. In further embodiments, the MFR of the blend is from about 3 to about 7 g/10 min.

In some embodiments, the polymer blends may have an Mn of from about 10,000 to about 200,000 g/mole, or from about 20,000 to about 150,000, or from about 30,000 to about 100,000. In the same or other embodiments, the polymer blends may have an Mw of from about 100,000 to about 400,000 g/mole, or from about 150,000 to about 300,000, or from about 200,000 to about 250,000. The polymer blends may also have an MWD of from about 1.5 to about 10, or from about 2.0 to about 4.0. In addition, the polymer blends may have a g' of from about 0.94 to about 0.99, or from about 0.95 to about 0.98.

The polymer blends described herein may, in some embodiments, have a melting point greater than about 100° C., or greater than about 110° C., or greater than about 115° C. In addition, the heat of fusion of the polymer blends may be less than about 30 J/g, or less than about 25 J/g, or less than about 20 J/g. In some embodiments of the present invention, the polymer blends prepared in dual reactors as described above have a melting point that is at least about 5° C. greater, or at least about 10° C. greater, than the melting point of a polymer blend having the same overall composition but prepared by physically blending the first and second polymers rather than by reactor blending.

Compounding of the Polymer Blend

In some embodiments of the present invention, the polymer blends described herein may be compounded with one or more additional components. Additional components suitable for compounding with the polymer blend are well known to persons of skill in the art and may include, but are not limited to, coagents, secondary elastomers, polypropylene, additives, fillers, and additive oils. In further embodiments, the polymer blends are compounded with at least one or more coagents, with or without other additional components.

In one or more embodiments, the individual materials and components, such as the polymer blends described herein and optionally the one or more coagents, secondary elastomers, polypropylene, additives, fillers, and/or additive oils may be blended by melt-mixing to form a compounded blend. Examples of machinery capable of generating the required shear and mixing for compounding include extruders with kneaders or mixing elements with one or more mixing tips or flights, extruders with one or more screws, extruders of co or counter rotating type, Banbury mixers, Farrell Continuous mixers, and Buss Kneaders. The type and intensity of mixing, temperature, and residence time required can be achieved by the choice of one of the above machines in combination with the selection of kneading or mixing elements, for example, screw design and screw speed of an extruder. Screw design and screw speed of an extruder for making the composition of the present invention may vary from the materials being processed and the amount of pre-mixing, if any, and any single or twin screw could be used under some conditions. Preferably, the screw geometry can include good solids conveying coupled with optimized mixing elements to provide good homogenization. Both distributive and dispersive mixing elements can be used to provide the uniform output required. One example of preferred mixing screw geometry includes a barrier flight screw, often referred to in the art as a "Maillefer" screw. Preferably, the screw speed can be less than 3000 RPM, or less than 1000 RPM, or less than 500 RPM, or less than 300 RPM. A ratio of the length to diameter (L/D) of an extruder useful in the present invention can be 10:1 or greater, preferably 15:1 or greater, more preferably 20:1 or greater, and most preferably 25:1 or greater.

In one or more embodiments, the coagents antioxidants, and/or other additives can be introduced at the same time as the other polymer components or later downstream, in the case of using an extruder or Buss kneader, or only later in time. In further embodiments, the coagents antioxidants, and/or other additives may be incorporated into the polymer product by in-line compounding, in which the additives are introduced into the second reactor at the time the second polymer is formed. This eliminates the need for additional compounding steps and equipment. In addition to the coagents and antioxidants described, other additives can include, but are not limited to, antiblocking agents, antistatic agents, ultraviolet stabilizers, pigments, coloring agents, nucleating agents, fire or flame retardants, plasticizers, vulcanizing or curative agents, vulcanizing or curative accelerators, tackifiers, flow improvers, lubricants, mold release agents, foaming agents, reinforcers, and processing aids. The additives can be added to the blend in pure form or in master batches. Fillers suitable for use in the compounded polymer blends of the present invention are well known in the art and may include granular, fibrous, and powder-like fillers. Particular fillers which may be suitable for use in the present invention include natural and synthetic clays, carbon black, and diatomaceous earth, among others.

Illustrative ingredients with which the polymer blends may be compounded are set forth in greater detail below, but persons of skill in the art will recognize that the following description is not inclusive, and that any material suitable for compounding with the polymer blends described herein may be employed.

Coagents

The polymer blends described herein can optionally include one or more coagents. Suitable coagents may include liquid and metallic multifunctional acrylates and methacrylates, functionalized polybutadiene resins, functionalized cyanurate, and allyl isocyanurate. More particularly, suitable coagents can include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate, azobisisobutyronitrile and the like, and combinations thereof. In one or more embodiments, suitable coagents include triacrylates, and in a particular embodiment the coagent is trimethylolpropane trimethacrylate. Commercially available coagents suitable for use in the present invention include, but are not limited to, Sartomer 350, Sartomer SR523, Saret SR517R, Saret SR519R, PRO 13083 (corresponding to Saret 517R with 1.5% times the standard amount of retarder).

In one or more embodiments, the polymer blends contain at least 0.1 wt % of coagent based on the total weight of blend. In one or more embodiments, the amount of coagent(s) can range from about 0.1 wt % to about 15 wt %, based on the total weight of blend. In one or more embodiments, the amount of coagent(s) can range from a low of about 0.1 wt %, 1.5 wt % or 2.0 wt % to a high of about 4.0 wt %, 7.0 wt %, or 15 wt %, based on the total weight of blend. In further embodiments, the amount of coagent(s) is about 3 wt %, based on the total weight of blend.

Antioxidants

The polymer blends described herein may optionally include one or more anti-oxidants. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, phosphates, and hindered amines. Further suitable anti-oxidants are commercially available from, for example, Ciba Geigy Corp. under the tradenames Irgafos 168, Irganox 1010, Irganox 3790, Irganox B225, Irganox 1035, Irgafos 126, Irgastab 410, and Chimassorb 944. In one or more embodiments, the antioxidant comprises a phosphite ester, and may particularly be tris-(2,4-di-tert-butylphenyl)phosphite. The one or more antioxidants may be added to the polymer blends to protect against degradation during shaping or fabrication operations and/or to better control the extent of chain degradation.

In one or more embodiments, the polymer blends contain at least 0.1 wt % of antioxidant, based on the total weight of blend. In one or more embodiments, the amount of antioxidant(s) can range from about 0.1 wt % to about 5 wt %, based on the total weight of blend. In other embodiments, the amount of antioxidant(s) can range from a low of about 0.1 wt %, 0.15 wt % or 0.2 wt % to a high of about 1 wt %, 2.5 wt %, or 5 wt %, based on the total weight of blend. In further embodiments, the amount of antioxidant(s) is about 0.2 wt %, based on the total weight of blend.

Secondary Elastomers

The polymer blends of the present invention can optionally include one or more secondary elastomeric components. In at least one specific embodiment, the secondary elastomeric component can be or include one or more ethylene-propylene copolymers (EP). Preferably, the ethylene-propylene polymer (EP) is non-crystalline, e.g., atactic or amorphous, but in certain embodiments the EP may be crystalline (including "semi-crystalline"). The crystallinity of the EP is preferably derived from the ethylene, and a number of published methods, procedures and techniques are available for evaluating whether the crystallinity of a particular material is derived from ethylene. The crystallinity of the EP can be distinguished from the crystallinity of the propylene-based polymer by removing the EP from the composition and then measuring the crystallinity of the residual propylene-based polymer. Such crystallinity measured is usually calibrated using the crystallinity of polyethylene and related to the comonomer content. The percent crystallinity in such cases is measured as a percentage of polyethylene crystallinity and thus the origin of the crystallinity from ethylene is established.

In one or more embodiments, the EP can include one or more optional polyenes, including particularly a diene; thus, the EP can be an ethylene-propylene-diene terpolymer (commonly called "EPDM"). The optional polyene is considered to be any hydrocarbon structure having at least two unsaturated bonds wherein at least one of the unsaturated bonds is readily incorporated into a polymer. The second bond may partially take part in polymerization to form long chain branches but preferably provides at least some unsaturated bonds suitable for subsequent curing or vulcanization in post polymerization processes. Examples of EP or EPDM copolymers include those that are available under the trade name Vistalon from ExxonMobil Chemicals. Several commercial EPDMs are available from DOW under the tradenames Nordel IP and MG. Certain rubber components (e.g., EPDMs, such as Vistalon 3666) include additive oil that is preblended before the rubber component is combined with the thermoplastic. The type of additive oil utilized will be that customarily used in conjunction with a particular rubber component.

Examples of the optional polyenes include, but are not limited to, butadiene; pentadiene; hexadiene (e.g., 1,4-hexadiene); heptadiene (e.g., 1,6-heptadiene); octadiene (e.g., 1,7-octadiene); nonadiene (e.g., 1,8-nonadiene); decadiene (e.g., 1,9-decadiene); undecadiene (e.g., 1,10-undecadiene);

dodecadiene (e.g., 1,11-dodecadiene); tridecadiene (e.g., 1,12-tridecadiene); tetradecadiene (e.g., 1,13-tetradecadiene); pentadecadiene; hexadecadiene; heptadecadiene; octadecadiene; nonadecadiene; icosadiene; heneicosadiene; docosadiene; tricosadiene; tetracosadiene; pentacosadiene; hexacosadiene; heptacosadiene; octacosadiene; nonacosadiene; triacontadiene; and polybutadienes having a molecular weight (Mw) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyltetrahydroindene; dicyclopentadiene; bicyclo(2.2.1)hepta-2,5-diene; and alkenyl-; alkylidene-; cycloalkenyl-; and cylcoalkyliene norbornenes [including, e.g., 5-methylene-2-norbornene; 5-ethylidene-2-norbornene; 5-propenyl-2-norbornene; 5-isopropylidene-2-norbornene; 5-(4-cyclopentenyl)-2-norbornene; 5-cyclohexylidene-2-norbornene; and 5-vinyl-2-norbornene]. Examples of cycloalkenyl-substituted alkenes include, but are not limited to vinyl cyclohexene; allyl cyclohexene; vinylcyclooctene; 4-vinylcyclohexene; allyl cyclodecene; vinylcyclododecene; and tetracyclododecadiene.

In another embodiment, the secondary elastomeric component can include, but is not limited to, styrene/butadiene rubber (SBR); styrene/isoprene rubber (SIR); styrene/isoprene/butadiene rubber (SIBR); styrene-butadiene-styrene block copolymer (SBS); hydrogenated styrene-ethylene/butylene-styrene block copolymer (SEBS); hydrogenated styrene-ethylene block copolymer (SEB); styrene-isoprene-styrene block copolymer (SIS); styrene-isoprene block copolymer (SI); hydrogenated styrene-isoprene block copolymer (SEP); hydrogenated styrene-isoprene-styrene block copolymer (SEPS); styrene-ethylene/butylene-ethylene block copolymer (SEBE); styrene-ethylene-styrene block copolymer (SES); ethylene-ethylene/butylene block copolymer (EEB); ethylene-ethylene/butylene/styrene block copolymer (hydrogenated BR-SBR block copolymer); ethylene-ethylene/butylene-ethylene block copolymer (EEBE); ethylene-ethylene/alpha-olefin block copolymers; polyisoprene rubber; polybutadiene rubber; isoprene butadiene rubber (IBR); polysulfide; nitrile rubber; propylene oxide polymers; star-branched butyl rubber and halogenated star-branched butyl rubber; brominated butyl rubber; chlorinated butyl rubber; star-branched polyisobutylene rubber; star-branched brominated butyl (polyisobutylene/isoprene copolymer) rubber; poly(isobutylene-co-alkylstyrene); preferably isobutylene/methylstyrene copolymers such as isobutylene/meta-bromomethylstyrene; isobutylene/bromomethylstyrene; isobutylene/chloromethylstyrene; halogenated isobutylene cyclopentadiene; and isobutylene/chloromethylstyrene, and mixtures thereof. Preferred secondary elastomeric components include hydrogenated styrene-ethylene/butylene-styrene block copolymer (SEBS), and hydrogenated styrene-isoprene-styrene block copolymer (SEPS).

The secondary elastomeric component can also be or include natural rubber. Natural rubbers are described in detail by Subramaniam in RUBBER TECHNOLOGY, pp. 179-208 (1995). Suitable natural rubbers may be Malaysian rubbers such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

The secondary elastomeric component can also be or include one or more synthetic rubbers. Suitable commercially available synthetic rubbers include NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product is BUDENE™ 1207.

The secondary elastomeric component can be present in an amount of up to 50 phr in one embodiment, or up to 40 phr in another embodiment, or up to 30 phr in yet another embodiment. In one or more embodiments, the amount of the secondary rubber component can range from a low of about 1, 7, or 20 phr to a high of about 25, 35, or 50 phr.

A suitable commercially available secondary elastomer for use in the present invention is MDV 91-9 available from ExxonMobil Chemical Co.

Polypropylene

In one or more embodiments, the compounded polymer blends described herein may contain additional amounts of polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or syndiotactic sequences, or both. The polypropylene can also include essentially syndiotactic sequences such that the melting point of the polypropylene is above 110° C. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins. As noted elsewhere herein, certain polypropylenes have a high MFR (e.g., from a low of 10, or 15, or 20 g/10 min to a high of 25 to 30 g/10 min). Others have a lower MFR, e.g., "fractional" polypropylenes which have an MFR less than 1.0. Those with high MFR may be preferred for ease of processing or compounding.

Additive Oil

The polymer blends described herein can also optionally include one or more additive oils. The term "additive oil" includes both "process oils" and "extender oils." For example, "additive oil" may include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include mineral oil, alpha olefinic synthetic oils, such as liquid polybutylene, e.g., products sold under the trademark Parapol®. Additive oils other than petroleum based oils can also be used, such as oils derived from coal tar and pine tar, as well as synthetic oils, e.g., polyolefin materials (e.g., SpectraSyn™ and Elevast™, both supplied by ExxonMobil Chemical Company).

The ordinarily skilled chemist will recognize which type of oil should be used with a particular composition, and will also be able to determine the suitable amount (quantity) of oil to be added. The additive oil can be present in amounts from about 5 to about 300 parts by weight per 100 parts by weight of the blend.

In some embodiments, the additive oil comprises a polybutene oil. Preferable polybutene oils have an Mn of less than 15,000, and include homopolymers or copolymers of olefin-derived units having from 3 to 8 carbon atoms and more preferably from 4 to 6 carbon atoms. In one or more embodiments, the polybutene is a homopolymer or copolymer of a $C_4$ raffinate. An embodiment of preferred low molecular weight polymers termed "polybutene" polymers is described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999) (hereinafter "polybutene processing oil" or "polybutene").

In one or more embodiments, the polybutene processing oil is a copolymer having to at least isobutylene derived units, and optionally 1-butene derived units, and/or 2-butene derived units. In one embodiment, the polybutene is a homopolymer if isobutylene, or a copolymer of isobutylene and 1-butene or 2-butene, or a terpolymer of isobutylene and 1-butene and 2-butene, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer. Commercial examples of a suitable processing oil include the PARAPOL™ series of processing oils or polybutene grades or Indopol™ oils, from Soltex Synthetic Oils and Lubricants or from BP/Innovene.

In certain embodiments, the processing oil or oils can be present at from 1 to 60, or from 2 to 40, or from 4 to 35, or from 5 to 30 parts by weight per 100 parts by weight of the blend.

Applications

The polymer blends of the present invention, whether compounded or not, may be formed or shaped into a wide variety of finished articles by finishing methods well known to those of skill in the art. Such articles may include, but are not limited to, films, fibers, nonwovens, coatings, molded articles, and the like. Finished articles may be formed by any suitable process, such as for example extrusion, blow molding, injection molding, meltblowing, spunbonding, compression molding, fiber spinning, and other processes known to those familiar with the art. The blends of the present invention are particularly useful in applications requiring stretchable elastic materials, such as in disposable diapers, training pants, incontinence pads, clothing, undergarments, sports apparel, automotive trim, weather-stripping, gaskets, and furniture upholstery, among others.

Grafting

In one or more embodiments, the polymer can be grafted (i.e. "functionalized") using one or more grafting monomers. As used herein, the term "grafting" denotes covalent bonding of the grafting monomer to a polymer chain of the polymer. The grafting monomer can be or include at least one hydrolysable silane component. A preferred hydrolysable silane component can be or include vinyl siloxane. Preferred vinyl siloxanes include vinyl triethoxysilane and vinyl trimethoxysilane.

In one or more embodiments, the grafting monomer can be or include at least one organic silane having the general formula $YSiRR''_2$, wherein Y is selected from vinyl terminated radicals, each R'' is independently selected from one or more hydrolysable organic radicals; and R can be a Y radical, a R'' radical, or selected from $C_1$-$C_{10}$ alkyl radicals (both R and R'' are bound to the silicon atom). In a particular embodiment, Y is selected from a vinyl radical, vinyl terminated $C_1$-$C_{10}$ alkyl radicals, vinyl terminated $C_1$-$C_{10}$ alkoxy radicals, and vinyl terminated $C_1$-$C_{10}$ alkoxy radicals. The vinyl terminated radical is preferably selected from vinyl, allyl, butenyl, cyclohexenyl, cyclopentadienyl, and cyclohexadienyl radicals.

In one or more embodiments, the grafting monomer can be or include one or more ethylenically unsaturated carboxylic acid or acid derivatives, such as an acid anhydride, ester, salt, amide, imide, acrylates or the like. Illustrative monomers include but are not limited to: acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxymethyl methacrylate, hydroxyl-ethyl methacrylate and higher hydroxy-alkyl methacrylates and glycidyl methacrylate. Maleic anhydride is a preferred grafting monomer.

In one or more embodiments, the grafted polymer comprises of from about 0.5 to about 10 wt % grafting monomer, more preferably from about 0.5 to about 6 wt %, more preferably from about 0.5 to about 3 wt %; in other embodiments from about 1 to about 6 wt %, more preferably from about 1 to about 3 wt %, based on the weight of the propylene-α-olefin. In a preferred embodiment, the grafting monomer concentration in the grafted polymer ranges from about 1 wt % to about 6 wt %, from about 1.5 wt % to about 6 wt %, from about 1.8 wt % to about 5.5 wt %, or from about 2.0 wt % to about 5.3 wt %.

The polymer blends of the present invention, whether compounded as described above or not and whether formed into finished articles or not, may be at least partially grafted with silane by a variety of methods known in the art. In particular, grafting silane to the blend may be accomplished by exposing the blend to electromagnetic radiation having a frequency greater than that of visible light, such as for example near ultraviolet radiation, extreme ultraviolet radiation, soft x-rays, hard x-rays, gamma rays, and high-energy gamma rays. In certain embodiments of the present invention, crosslinking is accomplished by electron beam radiation, or "e-beam" radiation.

E-beam radiation is a form of ionizing energy that is generally characterized by its low penetration and high dose rates. The electrons are generated by equipment referred to as accelerators which are capable of producing beams that are either pulsed or continuous. The term "beam" is meant to include any area exposed to electrons, which may range from a focused point to a broader area, such as a line or field. The electrons are produced by a series of cathodes (electrically heated tungsten filaments) that generate a high concentration of electrons. These electrons are then accelerated across a potential. The accelerating potential is typically in the keV to MeV range (where eV denotes electron volts), depending on the depth of penetration required.

Suitable e-beam equipment is available from E-BEAM Services, Inc., or from PCT Engineered Systems, LLC. Effective irradiation is generally carried out at a dosage from about 10 kGy to about 100 kGy, or from about 20 to about 90 kGy, or from about 30 to about 80 kGy, or from about 50 to about 60 kGy. In a particular aspect of this embodiment, the irradiation is carried out at room temperature. "0 kGy" when used in the examples of the present invention refers to conditions prior to e-beam irradiation.

Without wishing to be bound by theory, it is believed that two competing processes occur upon irradiation of polymers comprising propylene and ethylene, such as the inventive polymers described herein. In portions of the polymer chains containing pendant methyl groups (such as those polymer units derived from propylene), the carbon atoms in the polymer backbone are susceptible to chain scission upon irradiation, which results in lowered molecular weight. The irradiation process also breaks the bonds between carbon and hydrogen atoms comprising the backbones of the polymer chains, creating free radicals that are available to cross-link with free radicals on adjacent polymer chains.

Crosslinking with Moisture Curing

In an embodiment of the invention, following grafting with a silane via e-beam radiation, the polymer undergoes crosslinking. In a particular embodiment, the crosslinking is accomplished by exposing the grafted elastomeric composition to water ("moisture cure"). The grafted, elastomeric composition can be moisture cured after shaping or extruding the article or before shaping or extruding the article.

The article S. Yang et al., "Mechanism of a One-Step Method for Preparing Silane Grafting and Cross-linking Polypropylene" in Volume 47, Issue 7, POLYMER ENGINEERING AND SCIENCE, pp. 1004-1008 (2007), incorporated herein by reference, discloses grafting of silane to polypropylene, thus forming moisture cross-linkable propylene homopolymer.

Subjecting the composition thus produced to moisture, at an elevated temperature of greater than about 20° C., or greater than about 30° C., or greater than about 40° C. or greater than about 50° C., preferably of from 20° C. to 85° C., will induce crosslinking of the silane groups via a combined hydrolysis and condensation reaction. Atmospheric moisture is usually sufficient to permit the crosslinking to occur, but the rate of crosslinking may be increased by the use of an artificially moistened atmosphere, or by immersion in liquid water. For example, crosslinking is induced by a relative humidity of at least about 50%, or at least about 60%, or at least about 75% for at least about 10 hours, or at least about 25 hours, or at least about 50 hours, or at least about 75 hours. Preferably crosslinking is induced by exposure to at least about 90% relative humidity for approximately 100 hours. Also, subjecting the composition to heat and moisture will accelerate the crosslinking reaction. Most preferably, crosslinking is effected at a temperature of at least about 50° C. and most preferably by exposing the composition to a temperature of about 85° C. and a relative humidity of about 90% for approximately 100 hours. The end result is a cross-linked propylene-based polymer (or "cross-linked copolymer blend").

In at least one other specific embodiment, the propylene-based polymer, grafting monomer, free-radical initiator, and condensation catalyst, and optional polyolefinic thermoplastic resins, elastomers, and/or additives, can be pre-blended and passed through an extruder at a temperature above the melting point of the propylene-based polymer and decomposition temperature of the peroxide, in order to graft the silane onto the propylene-based polymer. Thus is produced the grafted propylene-based polymer (or copolymer blend composition). The grafted polymer can then be passed through a multi-strand die, cooled, and subsequently chopped into pellets with a strand pelletizer and dried. The pellets can then be melted and fabricated into a formed article that can be exposed to moisture at any time, preferably at a temperature above about 50° C. and most preferably by exposing the composition to a temperature of about 85° C. and a relative humidity of about 90% for approximately 100 hours, to effect crosslinking of the material.

Properties of the Crosslinked Polymer Blends

The at least partially crosslinked blends described herein combine good mechanical and elastic properties with improved pellet stability to provide optimized materials well suited for a variety of uses. In particular, the blends of the present invention exhibit better pellet stability than blends having similar compositions but prepared in a single reactor. The crosslinked compounded blends described herein which contain at least one coagent exhibit better mechanical and elastic properties, including reduced tendency to form gels, when compared to similar crosslinked compositions prepared in the same manner but lacking a coagent and an antioxidant.

EXAMPLES

The foregoing discussion can be further described with reference to the following non-limiting examples.

Four polymer blends, designated A, C, D, and E are inventive metallocene-catalyzed ethylene-propylene-diene elastomers prepared in a dual reactor parallel configuration mode. Polymer blend B is a metallocene-catalyzed ethylene-propylene-diene elastomer prepared in a single reactor mode. The catalyst used for preparing all of the polymer blends dimethylsiylbis(indenyl)hafnium dimethyl and the activator is dimethylaniliniumtetrakis(heptafluoronaphthyl) borate. Polymerization of all of the polymer blends was carried out in a single-phase, liquid-filled, stirred tank reactor with continuous flow of feeds to the system and continuous withdrawal of products under equilibrium conditions. All polymerizations were done in a solvent comprising predominantly $C_6$ alkanes, referred to generally as hexane solvent, using soluble metallocene catalysts and discrete, non-coordinating borate anion as co-catalysts. A homogeneous dilute solution of tri-n-octyl aluminum in hexane was used as a scavenger in concentrations appropriate to maintain reaction. Hydrogen, was added, if necessary, to control molecular weight. The hexane solvent was purified over beds of 3 A mole sieves and basic alumina. All feeds were pumped into the reactors by metering pumps, except for the ethylene, which flowed as a gas through a mass flow meter/controller. Reactor temperature was controlled adiabatically by controlled chilling of the feeds and using the heat of polymerization to heat the reactor. The reactors were maintained at a pressure in excess of the vapor pressure of the reactant mixture to keep the reactants in the liquid phase.

In this manner, the reactors were operated liquid full in a homogeneous single phase. Ethylene, propylene, and diene feeds were combined into one stream and then mixed with a pre-chilled hexane stream. A hexane solution of a tri-n-octyl aluminum scavenger was added to the combined solvent and monomer stream just before it entered the reactor to further reduce the concentration of any catalyst poisons. A mixture of the catalyst components in solvent was pumped separately to the reactor and entered through a separate port. The reaction mixture was stirred aggressively using a magna-drive system with three directionally opposed tilt paddle stirrers set to about 750 rpm to provide thorough mixing over a broad range of solution viscosities. Flow rates were set to maintain an average residence time in the reactor of about 10 minutes. On exiting the reactor, the copolymer mixture was subjected to quenching, a series of concentration steps, heat and vacuum stripping and pelletization, the general conditions of which are described in International Patent Publication WO 99/45041, incorporated herein by reference in its entirety. Additional processing conditions for the polymerization process of A to E and properties of A to E are included below in Table 1.

TABLE 1

| Blend ID | A | B | C | D | E |
|---|---|---|---|---|---|
| First Polymer Reactor Conditions | | | | | |
| $C_2$ (kg/hr) | 2.6 | 1.6 | 2.4 | 2.3 | 2.3 |
| $C_3$ (kg/hr) | 24.7 | 29.1 | 29.3 | 29.3 | 29.4 |
| ENB (kg/hr) | 0.9 | 1.7 | 1.8 | 1.8 | 1.4 |
| $C_6$ (kg/hr) | 86.7 | 84.3 | 82.4 | 80.5 | 82.2 |
| $H_2$ (sccm) | 0 | 0 | 0 | 0 | 0 |
| Reactor Temperature (° C.) | 70 | 74 | 75 | 76 | 76 |
| Feed Temperature (° C.) | −6 | 10 | 10 | 10 | 10 |
| First Polymer Properties | | | | | |
| Wt % $C_2$ | 17.0 | 11.0 | 16.0 | 15.0 | 15.0 |
| Wt % ENB | 2.4 | 4.1 | 4.1 | 4.2 | 3.3 |
| MFR (g/10 min) | 6.8 | 13 | 10.0 | 14.0 | 10.0 |
| Second Polymer Reactor Conditions | | | | | |
| $C_2$ (kg/hr) | 0.1 | n/a | 0.1 | 0.1 | 0.1 |
| $C_3$ (kg/hr) | 5.6 | | 3.7 | 3.7 | 3.8 |
| ENB (kg/hr) | 0.04 | | 0.1 | 0.1 | 0.1 |
| $C_6$ (kg/hr) | 3.9 | | 11.1 | 9.1 | 8.3 |
| $H_2$ (sccm) | 0 | | 0 | 0 | 0 |
| Reactor Temperature (° C.) | 90 | | 76 | 82 | 80 |
| Feed Temperature (° C.) | 20 | | 29 | 29 | 28 |
| Second Polymer Properties | | | | | |
| Wt % $C_2$ | 7.0 | n/a | 8.0 | 7.0 | 7.0 |
| Wt % ENB | 1.4 | | 4.0 | 4.0 | 3.0 |
| MFR (g/10 min) | 17.2 | | 27.0 | 42.0 | 24.0 |

TABLE 1-continued

| Blend ID | A | B | C | D | E |
|---|---|---|---|---|---|
| Overall Blend Properties | | | | | |
| Wt % $C_2$ | 15.1 | 10.0 | 14.0 | 13.0 | 13.0 |
| Wt % ENB | 2.1 | 4.0 | 3.9 | 4.0 | 3.2 |
| MFR (g/10 min) | 6.0 | 7.0 | 8.0 | 8.0 | 8.0 |

Polymer blends A through E were then compounded with polypropylene, a coagent, or combinations thereof. Each composition was prepared in a twin screw extruder. The extruder had an output rate of 100 kg/hr and a screw RPM of 200. The extruder had 15 barrel sections, the feed throat of the extruder had a barrel temperature of between 90-140° C., the middle section of the extruder had a barrel temperature of between 170-175° C., and the last section of the extruder had a barrel temperature of about 140° C. The die temperature was at 170° C. The compounded blends were then molded into plaques having a thickness of 2 mm.

The resulting compounded formulations, identified herein as Examples 1 through 6, were grafted using e-beam radiation, first at 50 kGy and then at 60 kGy. The compositions, process conditions, and mechanical properties are reported in Table 2, below.

Achieve™ 3854 is a polypropylene homopolymer having an MFR (2.16 kg at 230° C.) of 24 g/10 min and a density of 0.9 g/cm³. Achieve™ 3854 is commercially available from ExxonMobil Chemical Company.

Sartomer 350 is a trimethylolpropane trimethacrylate coagent that is commercially available from Sartomer Company, Inc. Sartomer 523 is a low viscosity dual functional methacrylate coagent commercially available from Sartomer Company, Inc. Saret SR517R is a methacrylate commercially available from Sartomer Company, Inc. PRO 13038 is a methacrylate Saret 517R with 1.5% times the standard amount of retarder.

Irgafos 168 is an antioxidant that is commercially available from Ciba Specialty Chemicals.

X-22-2475 is a single-end reactive silicone fluid commercially available from Shin-Etsu Chemical Co., Ltd.

Aerosil R 7200 is a surface modified fumed silica commercially available from Evonik Industries.

Jetfill 700C is an off-white talc commercially available from Fitz Chem.

MDV 91-9 is an ethylene-propylene-diene copolymer commercially available from ExxonMobil Chemical Co.

Dynasylvan VTMOEO is a silane commercially available from Degussa AG.

Physical properties of the compositions were evaluated before and after curing and are reported in Table 2.

TABLE 2

| Example No. | 1 | 2 | 3 | 4 | 5 | 6 | 7 | 8 |
|---|---|---|---|---|---|---|---|---|
| Composition (wt %) | | | | | | | | |
| Blend A | | | | 91.8 | | | | |
| Blend B | | | | | 91.8 | | | |
| Blend C | 99.8 | 91.9 | | | | | | |
| Blend D | | | 89.8 | | | 91.8 | | 96.8 |
| Blend E | | | | | | | 91.8 | |
| Achieve 3854 | | 5 | 5 | 5 | 5 | 5 | 5 | |
| Sartomer SR350 | | 2.9 | 3.0 | | | | | |
| X-22-2475 | | | 2.0 | | | | | |
| Irgafos 168 | 0.2 | 0.2 | 0.2 | 0.2 | 0.2 | 0.2 | 0.2 | |
| Saret SR517R | | | | 3.0 | 3.0 | 3.0 | 3.0 | 3.2 |

TABLE 2-continued

Mechanical Properties, Before E-Beam (0 kGy)

| | | | | | | |
|---|---|---|---|---|---|---|
| Stress at Break (MPa) | 6.0 | | 5.6 | 11.3 | 5.7 | 6.1 |
| Energy to Break (J) | 6.5 | | 5.3 | 10.8 | 6.2 | 6.5 |
| Strain at Break (%) | 470 | | 433 | 438 | 473 | 458 |
| 100% Modulus (MPa) | 3.2 | | 2.8 | 6.3 | 3.0 | 3.2 |

| Example No. | 9 | 10 | 11 | 12 | 13 | 14 | 15 |
|---|---|---|---|---|---|---|---|
| Composition (wt %) | | | | | | | |
| Blend C | | | | 86.6 | | | |
| Blend D | 91.9 | | 87.0 | | 81.7 | 91.8 | 89.9 |
| Blend E | | 92.0 | | | | | |
| Achieve 3854 | 5 | 5 | 5 | | 5 | 5 | 5 |
| V1803 (EPR) | | | | 2.5 | | | |
| BASF B27 E01 | | | | 7.5 | | | |
| Irgafos 168 | | 0.2 | 0.2 | 0.2 | 0.2 | 0.2 | 0.2 |
| Aerosil R 7200 | | | 4.7 | | | | |
| Jetfill 700C | | | | | 0.6 | | |
| MDV 91-9 | | | | | 9.5 | | |
| Saret SR517R | | | 3.1 | 3.2 | 3.0 | | 3.0 |
| Saret SR519R | | | | | | 3.0 | |
| Sartomer SR523 | | 2.8 | | | | | |
| Dynasylan VTMOEO | | | | | | | 1.9 |
| PRO 13038 | 3.1 | | | | | | |
| Mechanical Properties, Before E-Beam (0 kGy) | | | | | | | |
| Stress at Break (MPa) | 6.1 | 6.7 | 6.8 | | 5.3 | 6.8 | 6.8 |
| Energy to Break (J) | 6.5 | 6.6 | 7.4 | | 5.4 | 7.8 | 6.9 |
| Strain at Break (%) | 473 | 474 | 503 | | 448 | 522 | 500 |
| 100% Modulus (MPa) | 3.1 | 3.2 | 3.2 | | 2.9 | 3.3 | 2.9 |

Examples 1-14 of Table 2 were prepared by grafting via e-beam radiation but did not undergo silane grafting. Example 15 of Table 2 is the inventive formulation of the invention (silane (Dynasylan VTMOEO) grafted via e-beam radiation and crosslinked via moisture curing). Formulation 15 was blended with 5 wt % Achieve 3854 to make an injection molded plaque. Molded plaques were subjected to e-beam radiation at 0, 60, 75, and 90 kGy. Mechanical properties were tested at 23° C. and are reported in Table 3.

TABLE 3

| | Example No. | | | |
|---|---|---|---|---|
| E-beam | 15<br>0 kGy | 15<br>60 kGy | 15<br>75 kGy | 15<br>90 kGy |
| Shore Hardness A | 69 | 69 | 69 | 71 |
| Tensile 1000 Test (MPa) | | | | |
| 30 Modulus | 2.1 | 1.9 | 1.9 | 2.0 |
| 100 Modulus | 2.9 | 2.9 | 2.9 | 3.1 |
| Energy to Break (J) | 6.9 | 6.8 | 6.5 | 5.5 |
| Stress at Break (MPa) | 6.8 | 8.4 | 8.4 | 7.6 |
| % Strain at Break | 500 | 470 | 441 | 388 |

Example 11 of Table 2 is the inventive formulation of the invention. Formulation 11 was blended with 5 wt % Achieve 3854 to make an injection molded plaque. Molded plaques were subjected to e-beam radiation at 0, 60, 75, and 90 kGy. Mechanical properties were tested at 23° C. and are reported in Table 3.

TABLE 4

| | Example No. | | | |
|---|---|---|---|---|
| E-beam | 11<br>0 kGy | 11<br>60 kGy | 11<br>75 kGy | 11<br>90 kGy |
| Shore Hardness A | 72 | 71 | 71 | 72 |
| Tensile 1000 Test (MPa) | | | | |
| 30 Modulus | 2.3 | 2.1 | 2.0 | 4.5 |
| 100 Modulus | 3.2 | 3.1 | 3.1 | 3.3 |
| Energy to Break (J) | 7.4 | 7.9 | 7.1 | 4.7 |
| Stress at Break (MPa) | 6.8 | 9.0 | 8.5 | 8.7 |
| % Strain at Break | 503 | 489 | 452 | 243 |

Example 3 of Table 2 is the inventive formulation of the invention. Formulation 3 was blended with 5 wt % Achieve 3854 to make an injection molded plaque. Molded plaques were subjected to e-beam radiation at 0, 45, 60, 75, and 90 kGy. Mechanical properties were tested at 23° C. and are reported in Table 5.

TABLE 5

| | Example No. | | | | |
|---|---|---|---|---|---|
| E-beam | 3<br>0 kGy | 3<br>45 kGy | 3<br>60 kGy | 3<br>75 kGy | 3<br>90 kGy |
| Shore Hardness A | 72 | 74 | 75 | 74 | 74 |
| Tensile 1000 Test (MPa) | | | | | |
| 30 Modulus | 2.3 | 2.4 | 2.5 | 2.4 | 2.30 |
| 100 Modulus | 3.2 | 3.6 | 3.6 | 3.6 | 3.6 |
| Energy to Break (J) | 6.1 | 7.6 | 6.8 | 6.5 | 6.0 |
| Stress at Break (MPa) | 6.1 | 7.5 | 8.0 | 8.0 | 7.8 |
| % Strain at Break | 441.7 | 463.5 | 420.7 | 403.4 | 382.5 |

For purposes of convenience, various specific test procedures are identified above for determining certain properties such as tension set, percent elongation at break, Shore A Hardness, etc. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims. All numerical values can be considered to be "about" or "approximately" the stated value, in view of the nature of testing in general.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

Each of the appended claims defines a separate invention, which for infringement purposes is recognized as including equivalents of the various elements or limitations specified in the claims. Depending on the context, all references herein to the "invention" may in some cases refer to certain specific embodiments only. In other cases it will be recognized that references to the "invention" will refer to subject matter recited in one or more, but not necessarily all, of the claims. Each of the inventions is described herein, including specific embodiments, versions and examples, but the inventions are not limited to these embodiments, versions or examples, which are included to enable a person having ordinary skill in the art to make and use the inventions, when the information in this patent is combined with available information and technology.

We claim:

1. A process for making a grafted cross-linked polymer blend comprising the steps of:
   a) polymerizing a first polymer solution comprising a first polymer in a first reactor;
   b) polymerizing a second polymer solution comprising a second polymer in a second reactor;
      wherein the first and second polymers each comprise from about 75 to about 99 wt % propylene-derived units, from about 1 to about 25 wt % ethylene-derived units, and from about 0.05 to about 6 wt % diene-derived units;
   c) combining the first polymer solution with the second polymer solution to produce a polymer blend solution comprising a solvent, the first polymer, and the second polymer;
   d) removing the solvent from the polymer blend solution to produce a polymer blend;
   e) mixing the polymer blend with a coagent and a vinyl-terminated silane compound;
   f) subjecting the polymer blend to electron beam irradiation, thereby grafting the vinyl-terminated silane compound to either or both of the first polymer and the second polymer in the polymer blend to form a grafted polymer blend; and
   g) moisture curing the grafted polymer blend to form a grafted cross-linked polymer blend, wherein the grafted cross-linked polymer blend is substantially free of peroxide.

2. The process of claim 1, wherein the first polymer comprises from about 12 to about 20 wt % ethylene-derived units.

3. The process of claim 1, wherein the first polymer comprises from about 14 to about 18 wt % ethylene-derived units.

4. The process of claim 1, wherein the second polymer comprises from about 3 to about 10 wt % ethylene-derived units.

5. The process of claim 1, wherein the second polymer comprises from about 5 to about 8 wt % ethylene-derived units.

6. The process of claim 1, wherein the first polymer comprises from about 0.5 to about 5 wt % diene-derived units.

7. The process of claim 1, wherein the first polymer comprises from about 1 to about 3 wt % diene-derived units.

8. The process of claim 1, wherein the second polymer comprises from about 0.1 to about 1.0 wt % diene-derived units.

9. The process of claim 1, wherein the first polymer comprises from about 14 to about 18 wt % ethylene-derived units and from about 1 to about 3 wt % diene-derived units, and wherein the second polymer comprises from about 5 to about 8 wt % ethylene-derived units and from about 0.1 to about 1.0 wt % diene-derived units.

10. The process of claim 1, wherein the polymer blend comprises from about 10 to about 18 wt % ethylene-derived units.

11. The process of claim 1, wherein the polymer blend comprises from about 12 to about 16 wt % ethylene-derived units.

12. The process of claim 1, wherein the polymer blend comprises from about 0.1 to about 5.0 wt % diene-derived units.

13. The process of claim 1, wherein the polymer blend is subjected to electron beam irradiation in an amount of from about 30 to about 100 kGy.

14. A grafted cross-linked polymer blend prepared by the process of claim 1.

15. The polymer composition of claim 14, wherein the first polymer comprises from about 14 to about 18 wt % ethylene-derived units and from about 1 to about 3 wt % diene-derived units, and wherein the second polymer comprises from about 5 to about 8 wt % ethylene-derived units and from about 0.1 to about 1.0 wt % diene-derived units.

16. The polymer composition of claim 14, wherein the polymer blend is subjected to electron beam irradiation in an amount of from about 30 to about 100 kGy.

* * * * *